(12) United States Patent
Daoud et al.

(10) Patent No.: US 6,868,218 B2
(45) Date of Patent: Mar. 15, 2005

(54) OPTICAL FIBER CLOSURE HAVING AN INTEGRATED BEND LIMITING FEATURE

(75) Inventors: Bassel H. Daoud, Parsippany, NJ (US); Ivan Pawlenko, Holland, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 158 days.

(21) Appl. No.: 10/183,273

(22) Filed: Jun. 27, 2002

(65) Prior Publication Data

US 2004/0001685 A1 Jan. 1, 2004

(51) Int. Cl.[7] .................................................. G02B 6/00
(52) U.S. Cl. ........................ 385/135; 385/134; 385/136
(58) Field of Search ........................................ 385/135

(56) References Cited

U.S. PATENT DOCUMENTS

| | | | |
|---|---|---|---|
| 6,044,194 A | 3/2000 | Meyerhoefer | ............... 385/134 |
| 6,321,017 B1 * | 11/2001 | Janus et al. | ................. 385/134 |
| 6,351,591 B1 | 2/2002 | Daoud | ........................ 385/135 |
| 6,385,381 B1 | 5/2002 | Janus et al. | ................. 385/135 |
| 6,388,891 B1 * | 5/2002 | Falkenberg et al. | ......... 361/796 |
| 6,625,373 B1 * | 9/2003 | Wentworth et al. | ......... 385/134 |

* cited by examiner

*Primary Examiner*—John R. Lee
*Assistant Examiner*—Phillip Johnston

(57) ABSTRACT

An optical fiber closure includes a housing having opposing walls, each of the opposing walls having an aperture defined therein. Each aperture is adapted to receive an optical fiber therethrough. A bend limiter is proximate each aperture. Each bend limiter includes a proximate edge, a distal edge, and an arcuate surface. The arcuate surface extends between the proximate and distal edges and has a radius of curvature greater than a predetermined minimum bend radius. The distal edge of each bend limiter is substantially aligned with an outer edge of a respective one of the opposing walls of the optical fiber closure.

7 Claims, 6 Drawing Sheets

OPTICAL FIBER CLOSURE HAVING AN INTEGRATED BEND LIMITING FEATURE

BACKGROUND OF THE INVENTION

1. Field of the Invention

The present invention generally relates to optical fiber closures and, more particularly, to an optical fiber closure having an integrated bend limiting feature.

2. Description of the Related Art

Optical communications refer to the medium and the technology associated with the transmission of information as light pulses. Many applications utilize an optical fiber network to establish optical communications between network locations. In order to enable optical communication and the flow of optical signals between network locations, various interconnections must be established between different optical fibers.

Optical fiber cable consists of a plurality of optical fibers surrounded by protective sheath. Each individual optical fiber ("fiber") consists of a small diameter core of low-loss material such as glass or plastic surrounded by a protective cladding that has a slightly lower index of refraction than the core. Light, as it passes from a medium of higher index of refraction to one of lower index of refraction, is bent away from the normal to the interface between the two media. At a critical angle of incidence, transmitted light is totally reflected within the medium having the higher index of refraction. Building on these basic rules of physics, optical fibers are designed and made such that there is essentially total reflection of light as it propagates through an optical fiber core. Thus, the core is able to guide light pulses with small attenuation of transmitted light pulses and low signal loss.

In many cases of signal transmission via optical media, a key transmission parameter is signal loss per distance transmitted. Due to the sensitive nature of the core of an optical fiber, there is a need to protect an optical fiber from external sources of stress, such as bending, pressure and strain, which increase signal loss. For example, an optical fiber should not be bent sharply anywhere along its path. If an optical fiber is bent past a critical angle, portions of transmitted light pulses will not be reflected within the core of the optical fiber and will no longer traverse the optical fiber. These attenuated portions of light pulses result in signal loss and, thus, degradation of signal quality. Moreover, excess stress on an optical fiber may result in breakage of the fiber resulting in a total signal loss.

Referring to FIG. 1a, there is shown a simple ray model of light pulse transmission via a straight optical fiber. The optical fiber 100, shown in longitudinal cross section, has an optical core 102 that is surrounded by a cladding 104 and has a critical angle $\theta_c$. FIG. 1b shows a simple ray model of light pulse transmission on a bent optical fiber. As illustrated, when the bend of the optical fiber 100 is such as to cause a light ray to strike the boundary of the core 102 and cladding 104 at an angle greater than the critical angle $\theta_c$—the angular excess, as shown in the inset, being labeled $\theta_{bend}$—the light ray leaks out of the optical fiber core. Further, while lower order mode light rays are not likely to leak out of the optical fiber core, they may be transformed into higher order mode light rays and may leak out at a subsequent bend in the optical fiber. Accordingly, it is necessary that an optical fiber be routed so that bends in the optical fiber are of a sufficient radius to substantially avoid occurrence of such extra critical angle, and the associated light leakage.

The minimum bend radius characterizes the radius below which an optical fiber should not be bent to avoid light ray leakage. Typically, the minimum bend radius varies with fiber design. Bending an optical fiber with a radius smaller than the minimum bend radius may result in increased signal attenuation and/or a broken optical fiber.

Ordinarily, a unique optical fiber routing will be required to transmit light pulses between network locations. Over this unique route, light pulses may be propagated across several different optical fibers. At each transition from one fiber to another, individual optical fibers may be joined together by a splice connection or an optical connector, thereby enabling light pulses to be carried from/between a first fiber and a second fiber. Once made, a connection must be held securely in place to prevent a loss of transmission quality.

It may be necessary to bend optical fibers around corners and other obstacles in order to route the optical fiber to/from optical fiber network equipment and accomplish the required connections. While performing such activity, stresses on the optical fiber must be limited. Moreover, connections of optical fibers need to be isolated and protected from environmental degradation, strain, and torque in order to maintain the proper alignment between connected optical fibers and to avoid undesirable signal attenuation.

SUMMARY OF THE INVENTION

The present invention is an optical fiber closure having an integrated bend limiting feature. The optical fiber closure of the present invention comprises a housing having opposing walls, each of the opposing walls having an aperture defined therein. Each aperture is adapted to receive an optical fiber therethrough. A bend limiter is proximate each aperture. Each bend limiter includes a proximate edge, a distal edge, and an arcuate surface. The arcuate surface extends between the proximate and distal edges and has a radius of curvature greater than a predetermined minimum bend radius. In addition, the distal edge of each bend limiter is substantially aligned with an outer edge of a respective one of the opposing walls of the optical fiber closure.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

The present invention is an optical fiber closure having an integrated bend limiting feature. The present invention will be described in the context of modular optical fiber closures adapted to be stacked in vertical columns arranged side-by-side. As would be apparent to those skilled in the art, however, various changes using different configurations may be made without departing from the scope of the invention. Thus, the invention is not considered limited to the particular illustrative embodiments shown in the specification and all such alternate embodiments are intended to be included in the scope of this invention.

Figure 1A:
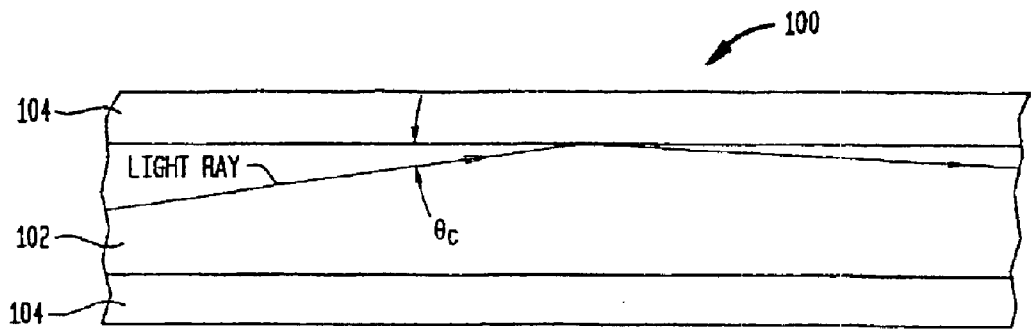
FIG. 1a is a simple ray model of light pulse transmission for a straight optical fiber.
Figure 1B:
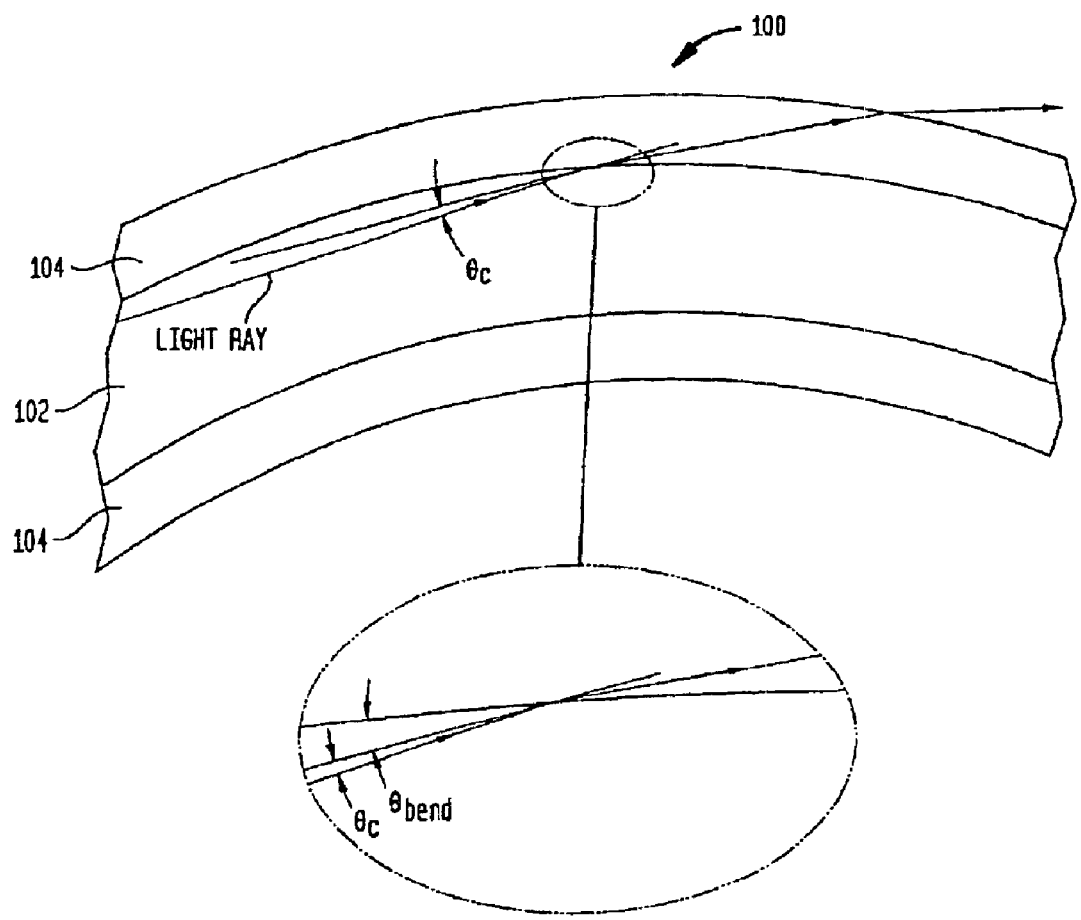
FIG. 1b is a simple ray model of light pulse transmission for a bent optical fiber.
Figure 2:
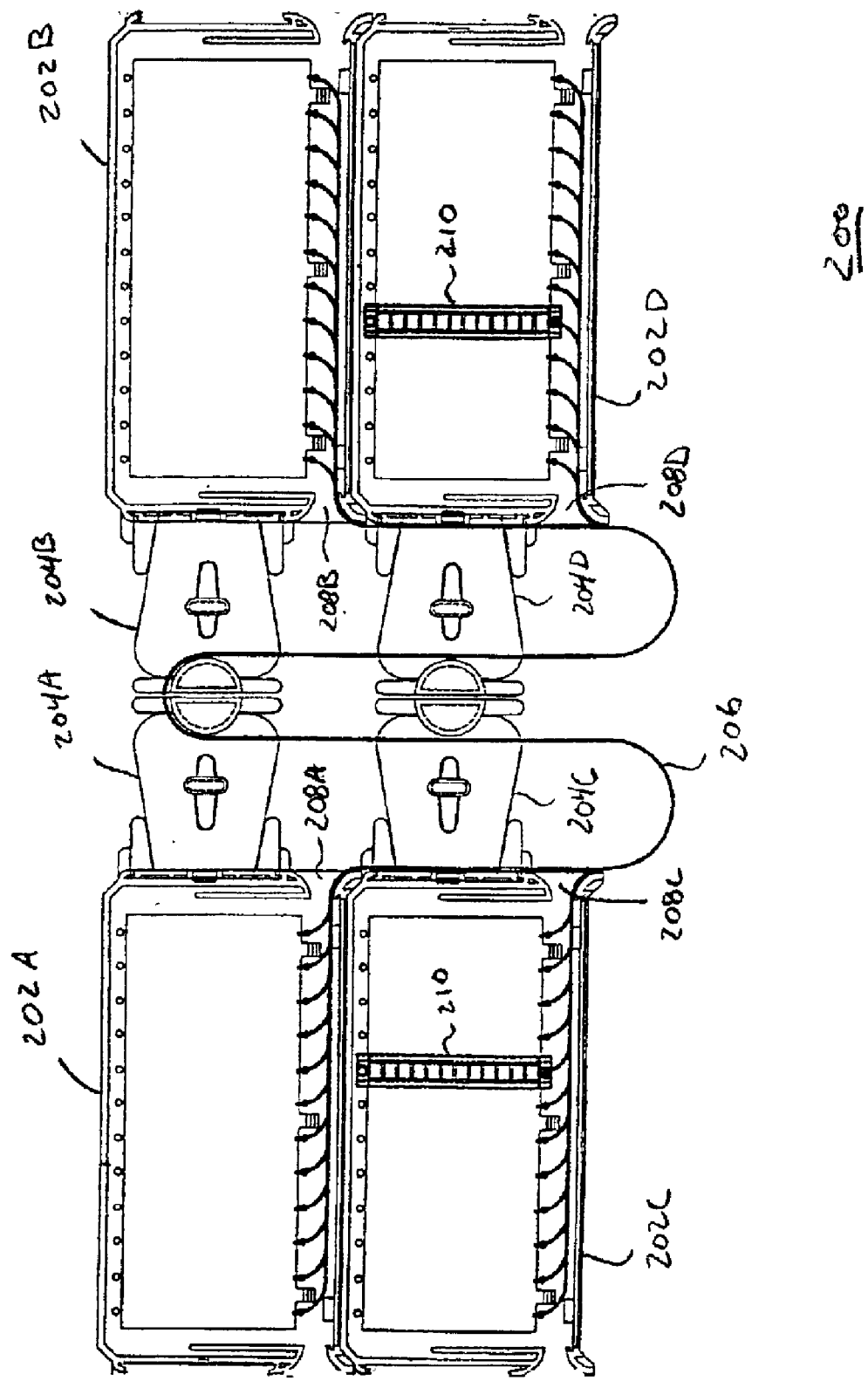
FIG. 2 is a front view of a modular optical fiber closure system in accordance with one embodiment of the present invention.

FIG. 2 is a front view of a modular optical fiber closure system 200 in accordance with one embodiment of the present invention. The optical fiber closure system 200 comprises a plurality of optical fiber closures 202, for example, optical fiber closures 202A through 202D (generally referred to herein as optical fiber closures 202 or optical fiber closure 202). In this illustrative embodiment, fiber closures 202A and 202C are stacked in a first vertical column, and fiber closures 202B and 202D are stacked in a second vertical column. The two vertical columns formed by the fiber closures 202 are arranged side-by-side. The two-by-two arrangement of fiber closures 202 shown can be extended to a more general M-by-N arrangement of fiber closures 202 as required.

Each of the fiber closures 202A through 202D is illustratively shown as having a single optical fiber trough 204A through 204D, respectively (generally referred to herein as optical fiber troughs 204 or optical fiber trough 204). Those skilled in the art will appreciate that, depending upon the arrangement of optical fiber closures 202, a particular one of the optical fiber closures 202 can comprise an optical fiber trough 204 on each side. Each of the optical fiber closures 202 can support several optical connector panels 210 (e.g., two are shown). The optical fiber closures 202 allow for termination and interconnection of optical fibers via optical connector panels 210, and also provide for storage of fiber slack via optical fiber troughs 204. For example, each of the optical fiber closures 202 can comprise a fiber cross-connect shelf (e.g., LGX shelf or a light-guide interconnection unit (LIU).

Briefly stated, optical fibers 206 connect optical fiber closures 202A and 202C with optical fiber closures 202B and 202D. Optical fibers 206 exit apertures 208A and 208C in optical fiber closures 202A and 202C, respectively. Slack in the optical fibers 206 is stored by optical fiber troughs 204A through 204D. Optical fibers 206 enter apertures 208B and 208D in optical fiber closures 202B and 202D, respectively.

In accordance with the present invention, optical fiber closures 202A through 202D include bend limiters proximate each of the apertures 208A through 208D, respectively, each bend limiter having a radius of curvature greater than a predetermined minimum bend radius. Each bend limiter is aligned with the outer edge of the wall of a respective optical fiber closure 202 to prevent excessive bending of optical fibers 206. Adjacent optical fiber troughs 204A and 204B (as well as 204C and 204D) combine to store optical fiber slack between two fiber closures 202. The optical fiber troughs 204 allow for sufficient spacing between fiber closures 202 such that the optical fibers 206 are not damaged.

Figure 3:
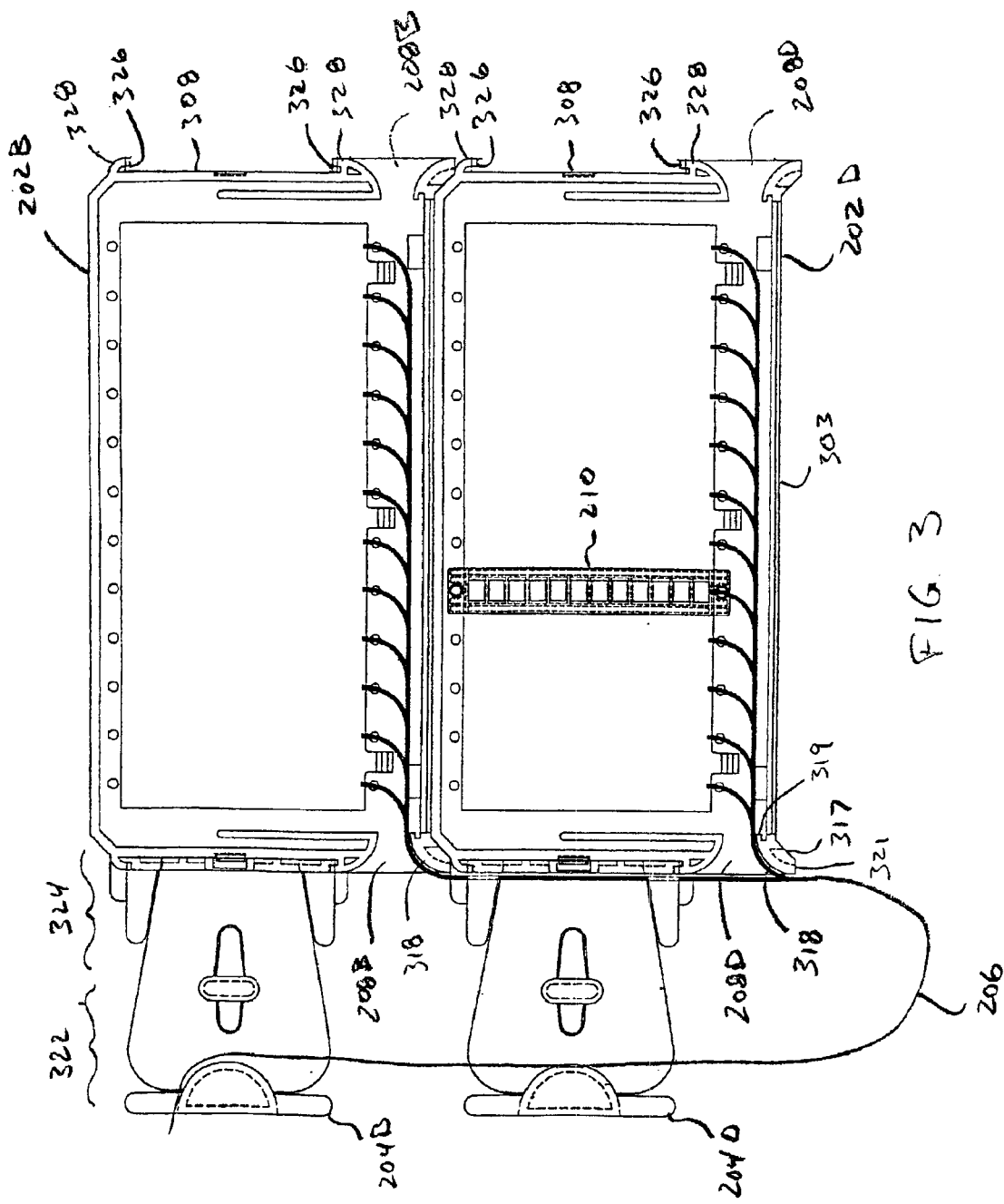
FIG. 3 depicts a more detailed front view of a pair optical fiber closures shown in FIG. 2.
Figure 4:
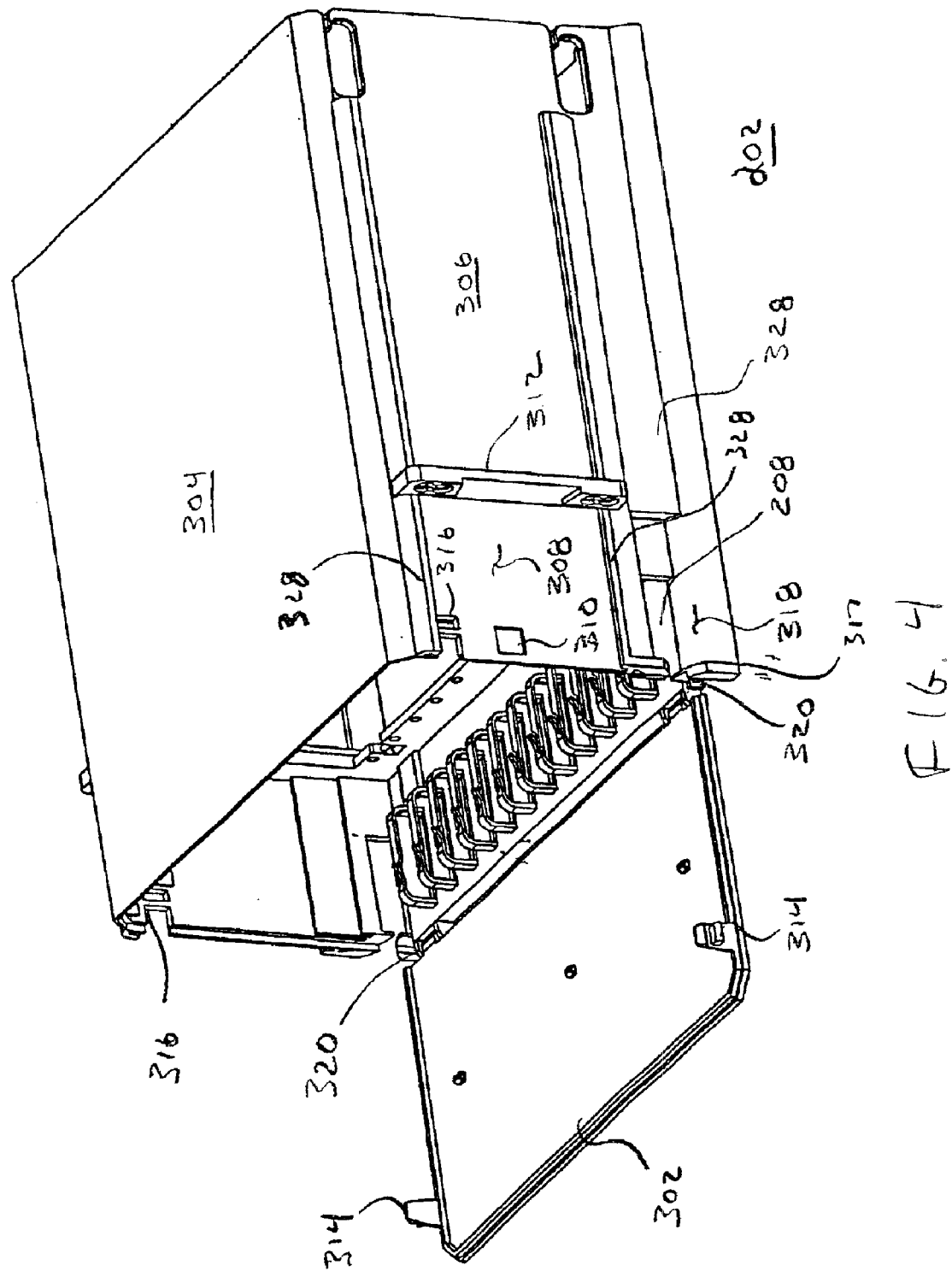
FIG. 4 depicts an isometric view of a single optical fiber closure of FIG. 2 above and to the right of the front thereof.

The optical fiber closures 202 of the present invention can be best understood with simultaneous reference to FIGS. 3 and 4. FIG. 3 depicts a more detailed front view of a pair optical fiber closures 202B and 202D in accordance with the present invention. FIG. 4 depicts an isometric view of a single optical fiber closure 202 above and to the right of the front thereof. Each of the optical fiber closures 202 comprises a top 304, a bottom 303, lateral opposing walls 306, a font cover 302, and a rear cover (not shown). Each of the opposing walls 306 includes an aperture 208 defined therein through which optical fibers 206 can pass. The front cover 302 is pivotally attached to the optical fiber closure 202 via hinges 320. The front cover 302 includes latch members 314 adapted to be inserted through holes 316 for securing the front cover 302 to the optical fiber closure 202 when the front cover 302 is in the closed position.

In accordance with the present invention, bend limiters 317 are secured to each housing 202 proximate each aperture 208. Each bend limiter 317 includes a proximate edge 319, a distal edge 321, and an arcuate surface 318 extending between the proximate and distal edges 319 and 321, respectively. Each bend limiter 317 extends the length of its respective aperture 208, and is secured to fiber closure 202 at the proximate edge 319. Alternatively, each bend limiter 317 can be formed integral with the optical fiber closure 202. The arcuate surface 318 of each bend limiter 317 has a radius of curvature greater than a predetermined minimum bend radius. The arcuate surface 318 is curved about an axis that is substantially normal to a front surface and a back surface of the housing. As such, as the optical fibers 206 entering or exiting the optical fiber closure 202 at the apertures 208 will not become over-bent or otherwise deleteriously affected as the optical fibers bend over each bend limiter 317.

As described above, the optical fiber closure 202 can also include at least one optical fiber trough 204 for storing optical fiber slack. An optical fiber trough 204 can be mounted to one or both of the walls 306 of an optical fiber closure 202. Each optical fiber trough 204 includes a first compartment 322 and a second compartment 324, for storing optical fiber slack. In one embodiment, each of the opposing walls 306 includes opposing channel forming members 328 extending along a portion of the length thereof. The opposing channel forming members 328 form opposing channels adapted to receive opposing edges of an optical fiber trough 204 for supporting the optical fiber trough 204 against a surface 308 of a respective wall 306. Each of the walls 306 can also include a bracket 312 extending between the opposing channels 326. Each bracket 312 is adapted to mate with a respective optical fiber trough 204 for holding the optical fiber trough 204 in place. In addition, each optical fiber trough 204 can include a latch for cooperating with hole 310 to further secure the optical fiber trough 204 to the optical fiber closure 202.

The distal end 321 of each bend limiter 317 is substantially aligned with the outer edge of a respective wall 306. In the present embodiment, the outer edge of a wall 306 is the outer edge of the channel forming members 328. When an optical fiber trough 204 is supported within the opposing channels 326 of a particular wall 306, the inner wall of the second compartment 324 of the optical fiber trough 204 is flush with the outer edge of the wall 306. As such, optical fibers bending over a bend limiter 317 of a particular optical fiber closure 202 will remain flush with the wall 306 and optical fiber trough 204 of another optical fiber closure 202 positioned below.

For example, optical fibers 206 exiting aperture 208B over bend limiter 317 of optical fiber closure 202B remain flush with the wall 306 and optical fiber trough 204D of optical fiber closure 202D. If the channel forming members 328 are not present (i.e., the wall 306 is not adapted to support an optical trough 204), the outer edge of such a wall 306 is the outer edge of the wall 306. In any case, each bend limiter 317 prevents the optical fibers 206 from excessive bending as the optical fibers exit a fiber closure 202, or when such optical fibers 206 are being accessed (e.g., accessing optical fibers during a tracing operation).

Figure 5:
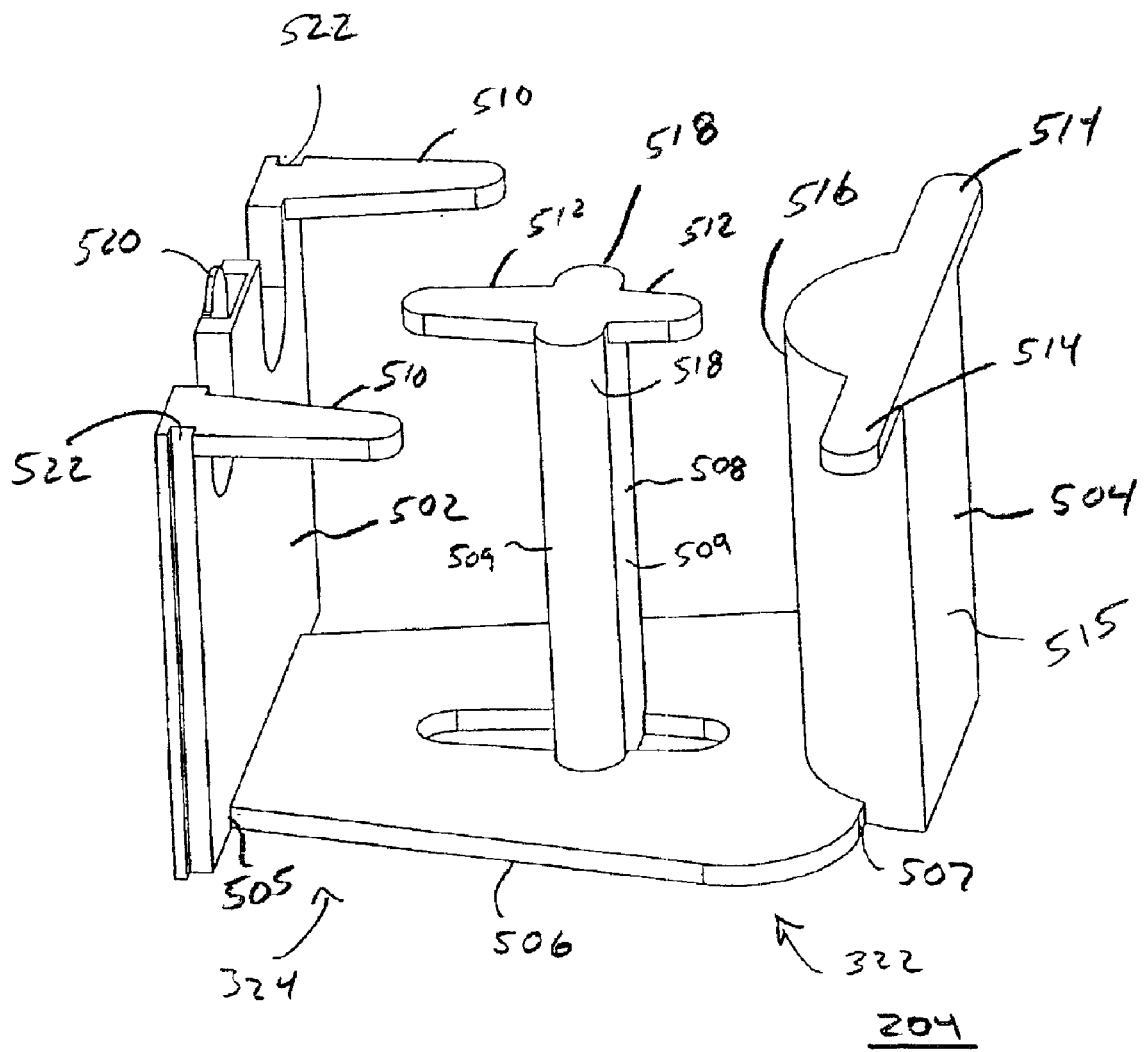
FIG. 5 depicts an isometric view of an optical fiber trough of an embodiment of the present invention.
Figure 6:
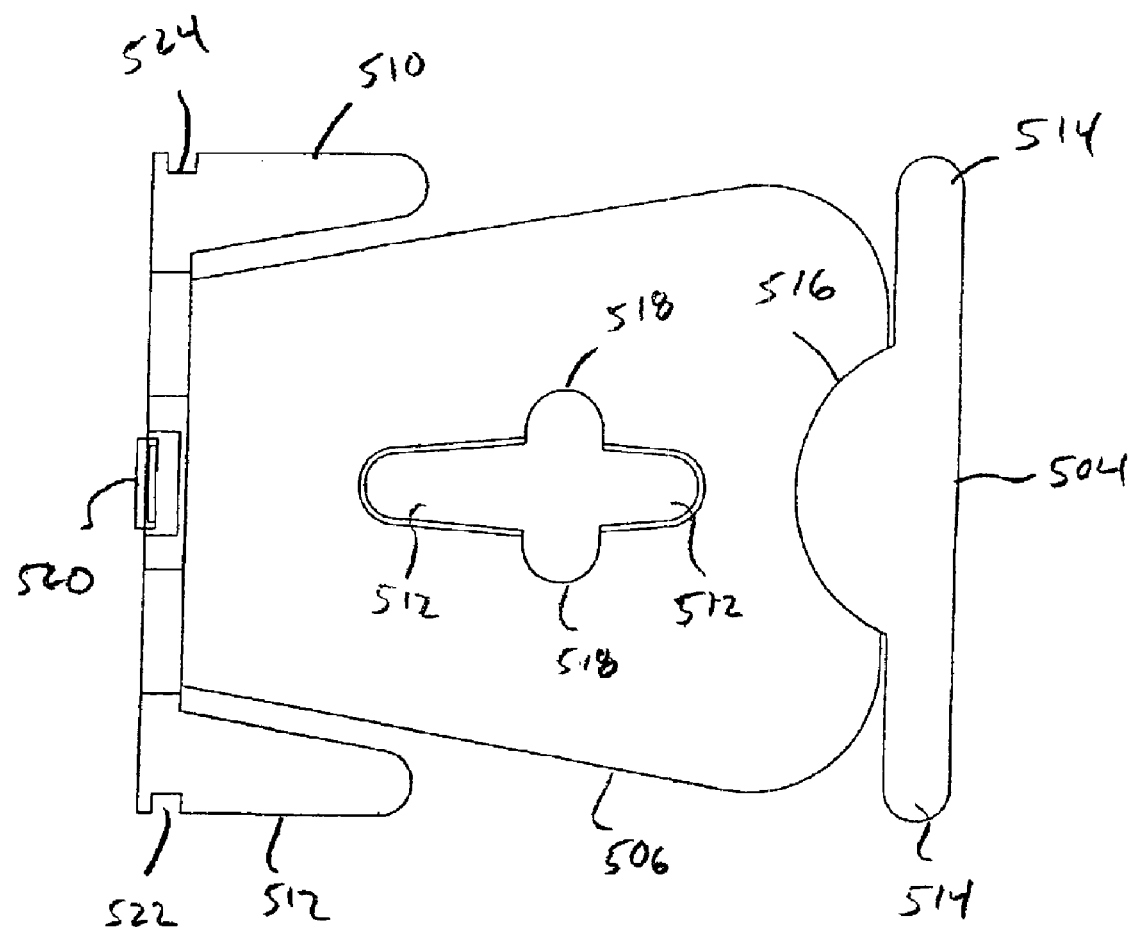
FIG. 6 depicts a front view of the optical fiber trough shown in FIG. 5.

The optical fiber troughs 204 of the present invention can be best understood with simultaneous reference to FIG. 5 and FIG. 6. FIG. 5 depicts an isometric view of an optical fiber trough 204 of an embodiment of the present invention.

FIG. 6 depicts a front view of the optical fiber trough 204 when the optical fiber trough 204 is mounted to an optical fiber closure 202. As shown, the optical fiber trough 204 comprises a base member 506 having an inner edge 505 and an outer edge 507, an inner member 502 extending outward from the inner edge 505, an outer member 504 extending outward from the outer edge 507, and a central member 508 extending outward from the base member 506 between the inner and outer members 502 and 504. As shown in FIG. 5, the inner and outer members 502 and 504 and the central member 508 all extend outward substantially the same distance from the base member 506. The first compartment 322 is formed between the central member 508 and the outer member 504. The second compartment 324 is formed between the inner member 502 and the central member 508. Each of the first and second compartments 322 and 324 are adapted to store optical fiber slack. To retain optical fiber slack, each of the inner, outer, and central members 502, 504, and 508 can include retainer members 510, 514, and 512, respectively.

The inner member 502 of the optical fiber trough 204 is adapted to be mounted to an optical fiber closure 202. In the present embodiment, the inner member 502 includes opposing grooves 522 formed in each of the opposing edges perpendicular with the base member 506. The opposing grooves 522 are adapted to communicate with opposing channels on the optical fiber closure 202, as described above. The inner member 502 can also include a latch 520 for securing the optical fiber trough 204 to an optical fiber closure 202.

The outer member 504 of the optical fiber trough 204 includes a flat surface 515 opposing an arcuate surface 516 (e.g., a half cylinder). The flat surface 515 faces outside the optical fiber trough 204, and the arcuate surface 516 faces the central member 508. The arcuate surface 516 has a radius of curvature greater than a predetermined minimum bend radius such that optical fibers traversing the arcuate surface 516 are not damaged. When a pair of optical fiber troughs 204 are arranged side-by-side (i.e., the flat surfaces 515 contact each other), the outer members 504 form a full cylinder around which optical fibers can be retained and stored.

The central member 508 of the optical fiber trough 204 includes opposing flat surfaces 509 and opposing arcuate surfaces 518. The opposing flat surfaces 509 face the inner member 502 and the outer member 504, respectively. Each of the opposing arcuate surfaces 518 has a radius of curvature greater than a predetermined minimum bend radius such that optical fibers traversing each of the opposing arcuate surfaces 518 are not damaged.

While the foregoing is directed to the preferred embodiment of the present invention, other and further embodiments of the invention may be devised without departing from the basic scope thereof, and the scope thereof is determined by the claims that follow.

What is claimed is:

1. An optical fiber closure, comprising:
   a housing having opposing walls, each of the opposing walls having an aperture defined therein and adapted to receive an optical fiber therethrough; and
   a bend limiter proximate each aperture, each bend limiter including a proximate edge, a distal edge, and an arcuate surface, the arcuate surface extending between the proximate and distal edges and having a radius of curvature greater than a predetermined minimum bend radius, the arcuate surface being curved about an axis that is substantially normal to a front surface and a back surface of the housing;
   wherein the distal edge of each bend limiter is substantially aligned with an outer edge of a respective one of the opposing walls, so that the optical fiber bending over the bend limiter and exiting through the aperture will remain flush with the associated opposing wall.

2. The optical fiber closure of claim 1, wherein each of the opposing walls includes opposing channels extending along a portion of a length thereof, the opposing channels adapted to receive opposing edges of an optical fiber trough, and wherein the distal edge of each bend limiter is substantially aligned with an inner wall of an optical fiber trough when such optical fiber trough is supported in the opposing channels of a respective one of the opposing walls.

3. The optical fiber closure of claim 2, wherein each of the opposing walls further includes a bracket extending between respective, opposing channels and adapted to mate with a respective optical fiber trough.

4. An optical fiber closure, comprising:
   a housing having opposing walls, each of the opposing walls having respective aligned apertures defined therein and adapted to receive an optical fiber therethrough, and each of the opposing walls having opposing channels extending along a portion of the length thereof,
   at least one optical fiber trough supported within opposing channels in a respective one of the opposing wells; and
   a bend limiter proximate each aperture, each bend limiter including a proximate edge, a distal edge, and arcuate surface, the arcuate surface extending between the proximate and distal edges and having a radius of curvature greater than a predetermined minimum bend radius, the arcuate surface being curved about an axis that is substantially normal to a front surface and a back surface of the housing;
   wherein the distal edge of each bend limiter is substantially aligned with an inner portion of an optical fiber trough when such optical fiber trough is supported in the opposing channels of a respective one of the opposing walls, so that the optical fiber bending over the bend limiter and exiting through the aperture will remain flush with the inner portion of the optical fiber trough on the associated opposing wall.

5. The optical fiber closure of claim 4, wherein the at least one optical fiber trough comprises:
   a base member having an inner edge and an outer edge;
   an inner member extending from outward from the inner edge, the inner member having opposing edges and a groove formed in each of the opposing edges;
   an outer member extending outward from the outer edge, the outer member having a flat surface opposing an arcuate surface; and
   a central member extending outward from the base member and disposed between the first and second side members, the central member having opposing flat surfaces and opposing arcuate surfaces;
   wherein the arcuate surface of the outer member and the opposing arcuate surfaces of the central member each have a radius of curvature greater than a predetermined minimum bend radius.

6. The optical fiber closure of claim 5, wherein the inner member, the outer member, and the central member each have opposing retainer members extending therefrom.

7. The optical fiber closure of claim 5, wherein the inner member includes a latch for securing the optical fiber trough to an optical fiber closure.

* * * * *